(12) United States Patent
Long et al.

(10) Patent No.: US 8,111,496 B2
(45) Date of Patent: Feb. 7, 2012

(54) EARTHING ARRANGEMENT FOR A DC ELECTRICAL SYSTEM AND A METHOD OF OPERATING AN EARTHING ARRANGEMENT FOR A DC ELECTRICAL SYSTEM

(75) Inventors: Stephen A Long, Carmel, IN (US); David R Trainer, Derby (GB); Lihua Hu, Rugby (GB); Huw L Edwards, Derby (GB)

(73) Assignee: Rolls-Royce PLC, London (GB)

( * ) Notice: Subject to any disclaimer, the term of this patent is extended or adjusted under 35 U.S.C. 154(b) by 335 days.

(21) Appl. No.: 12/379,033

(22) Filed: Feb. 11, 2009

(65) Prior Publication Data

US 2009/0229847 A1 Sep. 17, 2009

(30) Foreign Application Priority Data

Feb. 12, 2008 (GB) .................................. 0802549.6

(51) Int. Cl.
*H02H 3/22* (2006.01)
(52) U.S. Cl. ........................................................ 361/111
(58) Field of Classification Search .................... 361/111
See application file for complete search history.

(56) References Cited

U.S. PATENT DOCUMENTS

| | | | | | |
|---|---|---|---|---|---|
| 5,666,255 | A | * | 9/1997 | Muelleman | 361/111 |
| 6,166,458 | A | * | 12/2000 | Redburn et al. | 307/105 |
| 6,411,529 | B1 | * | 6/2002 | Svensson | 363/35 |
| 7,339,776 | B1 | * | 3/2008 | Hertel et al. | 361/111 |
| 2008/0089103 | A1 | * | 4/2008 | Hsu et al. | 363/132 |
| 2008/0265819 | A1 | * | 10/2008 | Chen et al. | 318/490 |
| 2009/0122584 | A1 | * | 5/2009 | Akerlund et al. | 363/126 |

FOREIGN PATENT DOCUMENTS

GB 2 436 648 A 10/2007
WO WO 2007136345 A1 * 11/2007

* cited by examiner

*Primary Examiner* — Rexford N Barnie
*Assistant Examiner* — Ann Hoang
(74) *Attorney, Agent, or Firm* — Oliff & Berridge, PLC

(57) ABSTRACT

An earthing arrangement for a DC electrical system (10), the electrical system (10) comprises a plurality of earthing points (24A, 24B, 24C) and each earthing point (24A, 24B, 24C) is directly and permanently connected to earth (26) by a high impedance connection (28A, 28B, 28C). Each earthing point (24A, 24B, 24C) is selectively connectable to earth (26) in electrical parallel with the high impedance connection (28A, 28B, 28C) by a solid connection (30A, 30B, 30C) and a switch (32A, 32B, 32C). In first mode of operation the switch (32A) between the earthing point (24A) and the earth (26) of only one of the plurality of earthing points (24A, 24B, 24C) is closed.

24 Claims, 3 Drawing Sheets

EARTHING ARRANGEMENT FOR A DC ELECTRICAL SYSTEM AND A METHOD OF OPERATING AN EARTHING ARRANGEMENT FOR A DC ELECTRICAL SYSTEM

The present invention relates to an earthing arrangement for a DC electrical system and a method of operating an earthing arrangement for a DC electrical system.

Earthing, often referred to as grounding, is one of the key design factors in all electrical systems, or electrical networks. Earthing has an influence on both the security and the reliability of an electrical system under fault conditions and the quality of supply under normal conditions.

Grounding is defined by the IEEE as "a conducting connection, whether intentional or unintentional, by which an electric current or equipment is connected to earth or some conducting body of relatively large extent that serves in place of earth".

Earthing methods for electrical systems/electrical networks have been established for many years, the common methods are classified as ungrounded, solidly grounded, high impedance grounded, low impedance grounded and resonant grounded.

The selection of grounding method is influenced by the specific application and is a compromise between factors such as cost, ease of fault detection, personnel safety, fault induced over-voltages and over currents, consistency of power supply, stress on components etc. Typically the electrical connection(s) from an electrical system to ground are at specified selected locations to achieve the optimum desired performance of the electrical system under normal conditions and abnormal, fault, conditions.

Traditional electrical systems employ a fixed architecture and therefore the consistency of the connections to earth is easily maintained within the electrical system or electrical network.

However, there is a requirement for more flexible electrical systems, or electrical networks, which have re-configurable architecture as a means of optimising the electrical supply and maintaining the reliability of the electrical supply. The reconfigurable electrical systems are able to re-configure their architecture as a means of optimising the power flow during normal operating conditions and maintaining the reliability of the power supply during faulted and/or over-loaded conditions. These re-configurable electrical systems must maintain a connection to earth throughout operation. Re-configurable electrical systems may inadvertently remove connections to earth from a main electrical system, or main electrical network, if a portion of the electrical system becomes isolated from the main electrical system. If a portion of the electrical system is switched out of the main electrical system, for example to remove a faulted portion of the electrical system, it is inevitable that the connection to earth could become isolated from the main electrical system leaving the main electrical system, or main electrical network, without a suitable earthing arrangement.

Therefore, there is a need for a more advanced earthing arrangement which ensures that as portions of an electrical system are switched in and out of the main electrical system the optimum connection of the electrical system to earth is maintained.

Accordingly the present invention seeks to provide a novel earthing arrangement for a DC electrical system which reduces, preferably overcomes, the above mentioned problem.

Accordingly the present invention provides an earthing arrangement for a DC electrical system, the electrical system comprising a plurality of earthing points, a plurality of high impedance connections to earth, a plurality of solid connections to earth and a plurality of switches, each switch is arranged to connect a respective one of the earthing points to earth by a respective one of the high impedance connections or to connect the respective one of the earthing points to earth by a respective one of the solid connections.

Each earthing point may be directly and permanently connected to earth by a high impedance connection and each earthing point is selectively connectable to earth in electrical parallel with the high impedance connection by a solid connection and a switch and wherein the switch between the earthing point and the earth of only one of the plurality of earthing points is closed.

Preferably a plurality of sources of electrical energy are provided, each source of electrical energy is removably connected to the electrical system by a respective pair of second switches, each source of energy has an earthing arrangement, each earthing arrangement having a earthing point.

Preferably the earthing point is from a load or from a cable of the electrical system.

Preferably the electrical system comprises a split +/− DC supply or a single 0/+ DC supply.

Preferably the earthing point is positioned between a first capacitance and a second capacitance.

Preferably the switch is a mechanical switch or an electrical switch.

Preferably a current limiting diode provides the high impedance connection between the earthing point and earth, the current limiting diode provides the solid connection between the earthing point and earth and the current limiting diode provides the switch.

Preferably the current limiting diode is a silicon carbide current limiting diode.

The present invention also provides a method of operating an earthing arrangement for a DC electrical system, the electrical system comprising a plurality of earthing points, a plurality of high impedance connections to earth, a plurality of solid connections to earth and a plurality of switches, wherein in a first mode of operation at least one of the switches is arranged to connect a respective one of the earthing points to earth by a respective one of the solid connections and in a second mode of operation said at least one of the switches is arranged to connect the respective one of the earthing points to earth by the respective one of the high impedance connections.

In a first mode of operation each of the switches may be arranged to connect a respective one of the earthing points to earth by a respective one of the solid connections and in a second mode of operation at least one of the switches is arranged to connect the respective one of the earthing points to earth by the respective one of the high impedance connections Alternatively each earthing point is directly and permanently connected to earth by a high impedance connection and each earthing point is selectively connectable to earth in electrical parallel with the high impedance connection by a solid connection and a switch, wherein in a first mode of operation, the method comprises closing the switch between the earthing point and the earth of a first one of the plurality of earthing points and opening the switches between the earthing point and the earth of the remainder of the plurality of earthing points.

In a second mode of operation, the method may comprise opening the switch between the first one of the plurality of earthing points and maintaining the switches between the earthing point and the earth of the remainder of the plurality of earthing points in an open condition.

In a third mode of operation, the method may comprise isolating the first one of the plurality of earthing points from the electrical system and closing the switch between the earthing point and the earth of a second one of the plurality of earthing points and opening the switches between the earthing point and the earth of the remainder of the plurality of earthing points.

The switch may b a mechanical switch or an electrical switch.

A current limiting diode may provide the high impedance connection between the earthing point and earth, the current limiting diode provides the solid connection between the earthing point and earth and the current limiting diode provides the switch.

The current limiting diode may be a silicon carbide current limiting diode.

The present invention will be more fully described by way of example with reference to the accompanying drawing in which:—

Figure 1:
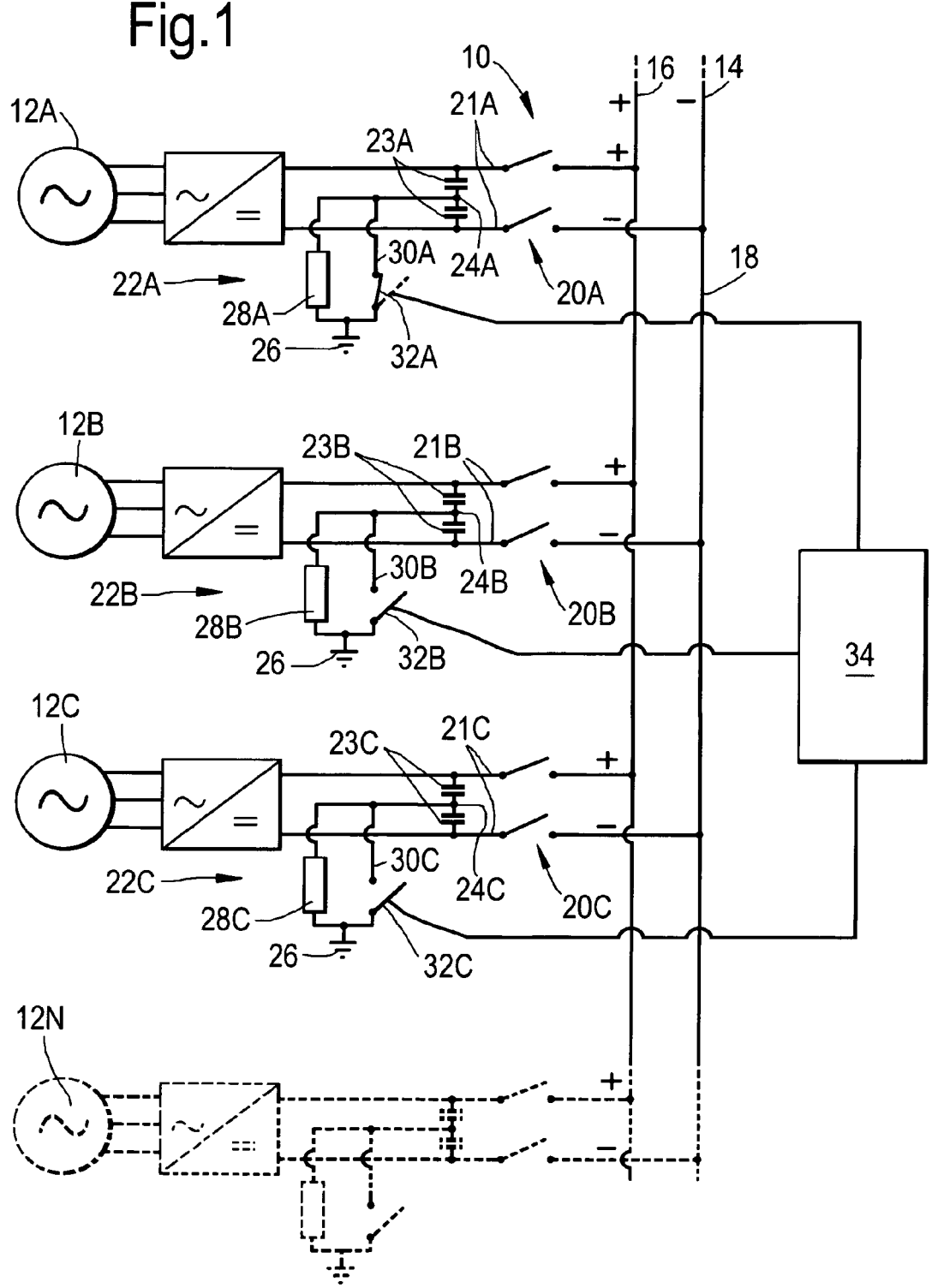
FIG. 1 shows an earthing arrangement for a DC electrical system according to the present invention.

An earthing arrangement for a DC electrical system 10 is shown in FIG. 1. The DC electrical system 10 comprises a plurality of sources of electrical energy 12A, 12B, 12C etc electrically connected to an electrical network 14 having electrical cables 16 and 18. The sources of electrical energy 12A, 12B, 12C may be electrical generators or electrical storage devices, e.g. batteries, fuel cells, solar cells, wind turbines, water turbines etc. Each source of electrical energy 12A, 12B, 12C is removably connected to the electrical network 14 of the electrical system 10 by a respective pair of switches 20A, 20B, 20C and a pair of electrical cables 21A, 21B, 21C respectively. Each pair of switches 20A, 20B, 20C electrically connects the associated source of electrical energy 12A, 12B, 12C to each of the electrical cables 16 and 18.

Each source of energy 12A, 12B, 12C has an earthing arrangement 22A, 22B, 22C. Each earthing arrangement 22A, 22B, 22C comprises an earthing point 24A, 24B, 24C respectively. Each earthing point 24A, 24B, 24C is directly and permanently connected to earth 26 by a high impedance connection 28A, 28B, 28C respectively. Each earthing point 24A, 24B, 24C is selectively connectable to earth 26 in electrical parallel with the respective high impedance connection 28A, 28B, 28C by a solid connection 30A, 30B, 30C respectively and a switch 32A, 32B, 32C respectively. The switch 32A between the earthing point 24A and the earth 26 of only one of the plurality of sources of energy 12A is closed and the switches 32B, 32C between the earthing points 24B, 24C and the earth 26 of all the other sources of energy 12B, 12C are open such that only earthing point 24A is directly connected to earth 26 by a solid connection 30A. A controller 34 is connected to each of the switches 32A, 32B, 32C to select the appropriate position for each of the switches 32A, 32B, 32C.

Each earthing point 24A, 24B, 24C is connected to the respective pair of cables 21A, 21B, 21C by a respective pair of capacitances 23A, 23B, 23C. Thus each earthing point 24A, 24B, 24C is positioned between a first capacitance and a second capacitance, such that there is effectively a split +/− DC supply.

Thus, the present invention provides a reconfigurable earthing arrangement in which each source of energy is connected to earth through an earthing point and the earthing points are always connected to earth via a high impedance connection and earthing points are also connected to earth via a solid connection and switch but at any particular time only one of the switches is closed and only one of the earthing points is connected to earth via the solid connection and the remainder of the switches are open. The switches 32A, 32B, 32C are fast acting switches.

A single solid connection 30A to earth 26 is desirable under normal, un-faulted, operating conditions to alleviate noise in the DC electrical system 10. However, a high impedance connection 28A, 28B, 28C to earth 26 is desirable at the instant a fault occurs in the DC electrical system 10 to limit the current and hence the energy being released.

The high impedance connections to earth at each source of energy enables the release of energy to be slowed in the event of fault condition and act as a back up connection to earth should the switch, or control for the switch, to connect the solid connection fail to operate.

In operation of the DC electrical system 10, switch 32A only is closed and thereby provides a solid connection 30A to earth 26 from the source of energy 12A and the remaining switches 32B, 32C are open. In the event of a rail to earth fault occurring anywhere in the DC electrical system 10, switch 32A is opened immediately by the controller 34 such that the high impedance connection 28A is provided in the fault path between the source of energy 12A and earth 26. The remaining switches 32B, 32C remain open. Once the fault is isolated, the switch 32 is closed again, by the controller 34, to reinstate the solid connection 30A to earth 26.

In operation if the source of energy 12A becomes isolated from the electrical network 14 at any time, for example during re-configuration following a fault occurring in the feeders to source of energy 12A, either switch 32B or switch 32C is closed, by the controller 34, simultaneously with the isolation of the source of energy 12A, by the controller 34, such that a solid connection 30B or 30C is provided from the source of energy 12B or 12C for the electrical network 14.

If for some reason an appropriate one of the switches 32A, 32B, 32C fails to close, for example due to a failure of the controller 34, the integrity of the DC electrical system 10 is maintained due to the presence of the high impedance connections 28A, 28B, 28C to earth 26, although the noise immunity is degraded due to the lack of a solid connection to earth 26. These back-up high impedance connections 28A, 28B, 28C are important to maintain safe and reliable operation of the DC electrical system 10.

Although the present invention has been described with reference to positioning the earthing points between a pair of capacitances to provide a split +/− DC supply it is equally possible to provide the earthing point for a 0/+ DC supply.

Although the present invention has been described with reference to providing earthing points and associated solid connections, switches and high impedance connections to earth from sources of energy it is equally possible to provide the earthing points and associated solid connections, switches and high impedance connections to earth from any part of the DC electrical system, including from loads or from the cables of the electrical network, whether a split +/− DC supply or a single 0/+ DC supply.

The advantages of the present invention are that the solid connection to earth reduces noise in the DC electrical system. The DC electrical system has the ability to limit energy release in the event of a positive rail to earth fault and/or a negative rail to earth fault. The DC electrical system has the ability to maintain a solid connection to earth as required, regardless of the number of sources of energy. The DC electrical system has the ability to reconfigure itself to maintain a solid connection to earth. The DC electrical system has the ability to maintain power continuity during a fault due to the presence of the high impedance connections. The DC electrical system has the ability to maintain safe operation in the event the controller, which controls the switches, to reconfigure the solid connections to earth fails to operate.

It may be possible to provide mechanical switches or electrical switches in the present invention.

Figure 2:
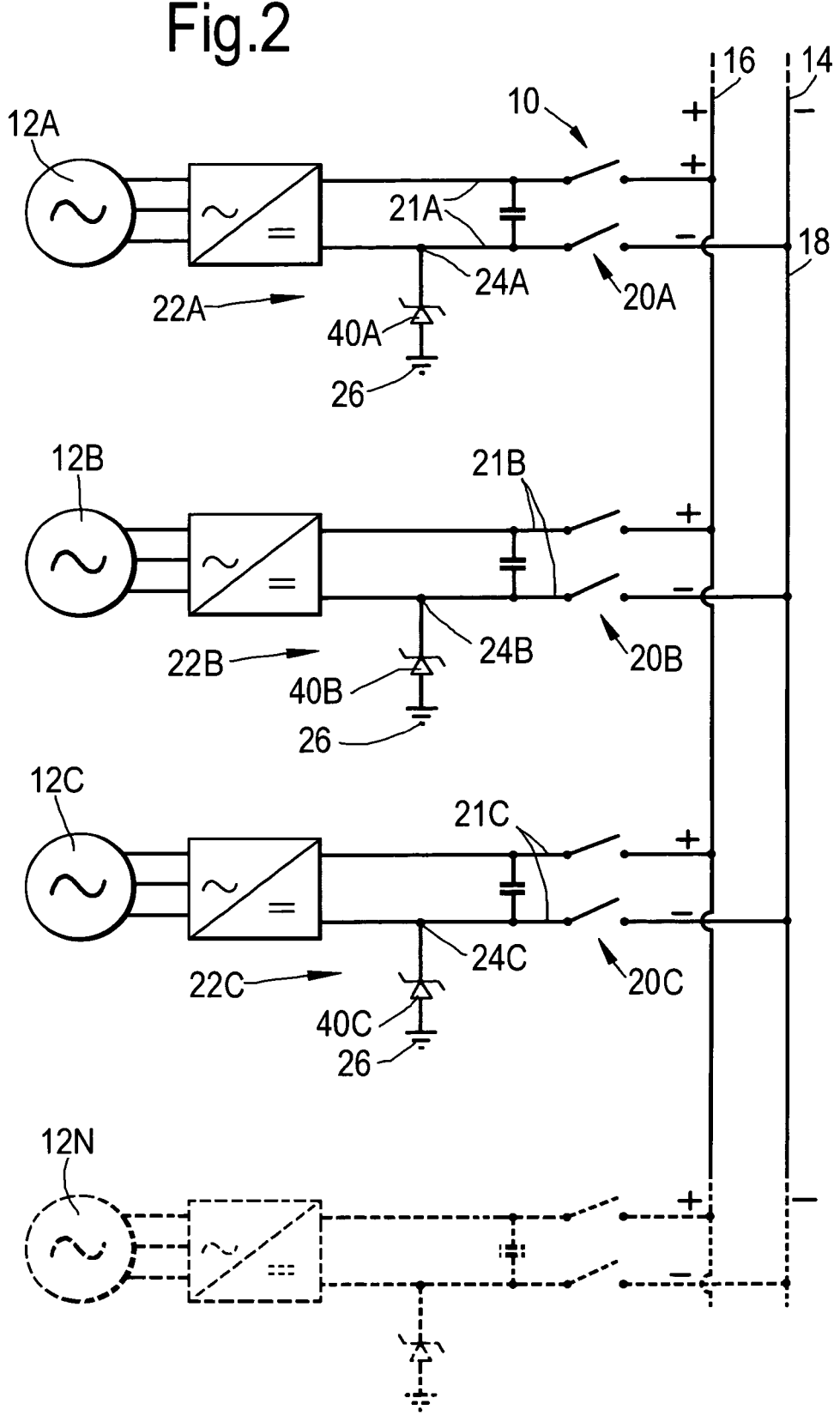
FIG. 2 shows a further earthing arrangement for a DC electrical system according to the present invention.

A further embodiment of the present invention is shown in FIG. 2, and the embodiment in FIG. 2 is similar to that in FIG. 1 and like parts are denoted by like numbers. In FIG. 2 a 0/+ DC electrical system is shown. In FIG. 2 current limiting diodes 40A, 40B, 40C, CLDs, for example silicon carbide current limiting diodes, SiC CLDs, are arranged between the earthing points 24A, 24B, 24C and earth 26 instead of the high impedance connector and the switch and solid connector. The earthing points 24A, 24B, 24C are provided on one of the pairs of electrical cables 21A, 21B, 21C. A current limiting diode 40 is effectively a resistance which dynamically changes, increases, with changing, increasing, current. In this arrangement the current limiting diode acts as a high impedance connector during fault conditions and a solid connection during normal conditions. In an un-faulted condition no current flows through the current limiting diodes 40A, 40B, 40C to earth 26 and therefore the current limiting diodes 40A, 40B, 40C behave as solid connections to earth 26. In a fault condition a high current flow through the current limiting diodes 40A, 40B, 40C to earth 26 is instantaneously limited and therefore the current limiting diodes 40A, 40B, 40C behave as high impedance connections to earth 26. The current limiting diodes 40A, 40B, 40C returns to its zero resistance state once the fault is cleared. It may be that only one, or two, etc of the diodes 40A, 40B or 40C behaves as a high impedance connection to earth while the others remain as solid connections to earth.

Figure 3:
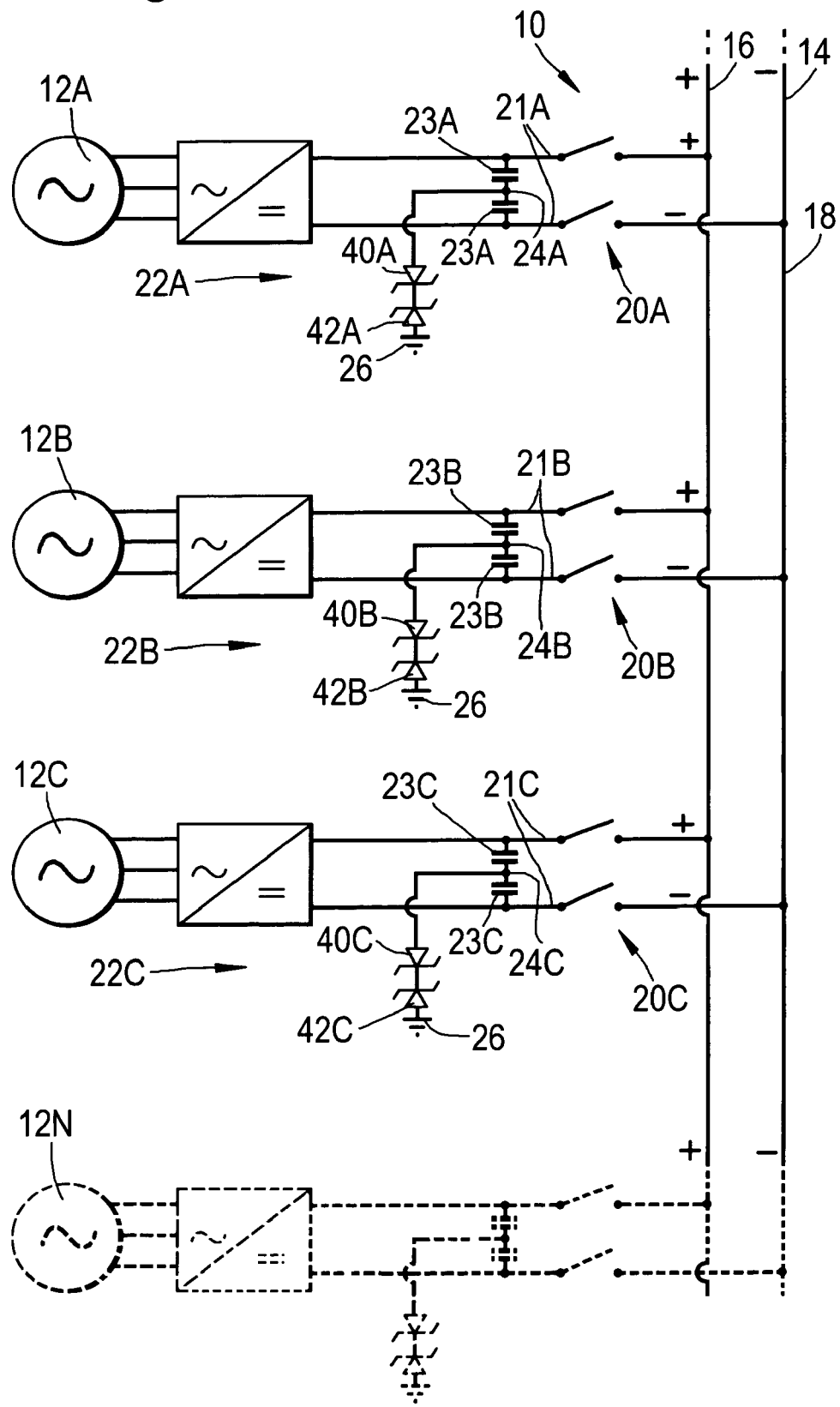
FIG. 3 shows another earthing arrangement for a DC electrical system according to the present invention.

A further embodiment of the present invention is shown in FIG. 3, and the embodiment in FIG. 3 is substantially the same as that in FIG. 1 and like parts are denoted by like numbers. In FIG. 3 pairs of current limiting diodes 40A, 42A, 40B, 42B, 40C, 42C CLDs, for example silicon carbide current limiting diodes, SiC CLDs, are arranged between the earthing points 24A, 24B, 24C and earth 26 instead of the high impedance connector and the switch and solid connector. A current limiting diode 40 is effectively a resistance which dynamically changes, increases, with changing, increasing, current. In this arrangement the current limiting diode acts as a high impedance connector during fault conditions and a solid connection during normal conditions. In an un-faulted condition no current flows through the current limiting diodes 40A, 42A, 40B, 42B, 40C, 42C to earth 26 and therefore the current limiting diodes 40A, 42A, 40B, 42B, 40C, 42C behave as solid connections to earth 26. In a fault condition a high current flow through the current limiting diodes 40A, 42A, 40B, 42B, 40C, 42C to earth 26 is instantaneously limited and therefore the current limiting diodes 40A, 42A, 40B, 42B, 40C, 42C behave as high impedance connections to earth 26. The current limiting diodes 40A, 42A, 40B, 42B, 40C, 42C returns to its zero resistance state once the fault is cleared. In addition it is noted that the current limiting diodes 40A, 42A, 40B, 42B, 40C, 42C of each pair are arranged to limit the current flow in opposite directions. Thus, in the event of a negative rail to earth fault occurring, the fault path is through one of the current limiting diodes 40A, 40B, 40C, which will limit the current, and in the event of a positive rail to earth fault occurring, the fault path is through one of the current limiting diodes 42A, 42B, 42C, which will limit the current. It is to be noted that the current limiting diodes in each pair of current limiting diodes 40A, 42A, 40B, 42B, 40C, 42C are arranged in series. It may be that the diodes of only one, or two, etc of the pairs of diodes 40A, 42A, 40B, 42B, 40C or 42C behaves as a high impedance connection to earth while the others remain as solid connections to earth.

Thus it is clear in FIGS. 2 and 3 that each current limiting diodes act as, at provides, the high impedance connection between the earthing point and earth, each current limiting diode acts as, or provides, the solid connection between the earthing point and earth and each current limiting diode acts as, or provides the switch.

We claim:

1. An earthing arrangement for a DC electrical system, the electrical system comprising a plurality of earthing points, a plurality of high impedance connections to earth, a plurality of solid connections to earth and a plurality of switches, each switch is arranged to connect a respective one of the earthing points to earth by a respective one of the high impedance connections or to connect the respective one of the earthing points to earth by a respective one of the solid connections,
wherein each earthing point is at a potential of zero volts,
wherein each earthing point is directly and permanently connected to earth by a high impedance connection and each earthing point is selectively connectable to earth in electrical parallel with the high impedance connection by a solid connection and a switch, and
wherein the switch between the earthing point and the earth of only one of the plurality of earthing points is closed.

2. An earthing arrangement as claimed in claim 1 comprising a plurality of sources of electrical energy, each source of electrical energy is removably connected to the electrical system by a respective pair of second switches, each source of electrical energy has an earthing arrangement, each earthing arrangement having an earthing point.

3. An earthing arrangement as claimed in claim 2 wherein the earthing point is positioned between a first capacitance and a second capacitance.

4. An earthing arrangement as claimed in claim 2 wherein each source of electrical energy is removably connected to the electrical system by a respective pair of cables, each earthing point is connected to the respective pair of cables by a respective pair of capacitances, each earthing point is positioned between the capacitances of the respective pair of capacitances such that there is a split +/− DC supply.

5. An earthing arrangement as claimed in claim 2 wherein each source of electrical energy is removably connected to the electrical system by a respective pair of cables, each earthing point is connected to one of the respective pair of cables and the DC electrical system is a 0/+ DC electrical system.

6. An earthing arrangement as claimed in claim 1 wherein the earthing point is from a load.

7. An earthing arrangement as claimed in claim 1 wherein the electrical system comprises a split +/− DC supply.

8. An earthing arrangement as claimed in claim 1 wherein the switch is selected from the group comprising a mechanical switch and an electrical switch.

9. An earthing arrangement as claimed in claim 1 wherein a current limiting diode provides the high impedance connection between the earthing point and earth, the current limiting diode provides the solid connection between the earthing point and earth and the current limiting diode provides the switch.

10. An earthing arrangement as claimed in claim 9 wherein the current limiting diode is a silicon carbide current limiting diode.

11. An earthing arrangement as claimed in claim 1 wherein the earthing point is from a cable of the electrical system.

12. An earthing arrangement as claimed in claim 1 wherein the electrical system comprises a single 0/+ DC supply.

13. An earthing arrangement as claimed in claim 1 comprising a split +/− DC supply connected to a pair of cables, each earthing point is connected to the pair of cables of the DC electrical system by a respective pair of capacitances, each earthing point is positioned between the capacitances of the respective pair of capacitances.

14. An earthing arrangement as claimed in claim 1 comprising a 0/+ DC supply connected to a pair of cables, each earthing point is connected to one of the pair of cables of the DC electrical system.

15. An earthing arrangement as claimed in claim 1 wherein each earthing point is associated with a separate power supply.

16. A method of operating an earthing arrangement for a DC electrical system, the electrical system comprising a plurality of earthing points, a plurality of high impedance connections to earth, a plurality of solid connections to earth and a plurality of switches, wherein in a first mode of operation at least one of the switches is arranged to connect a respective one of the earthing points to earth by a respective one of the solid connections and in a second mode of operation said at least one of the switches is arranged to connect the respective one of the earthing points to earth by the respective one of the high impedance connections, wherein each earthing point is at a potential of zero volts,
wherein each earthing point is directly and permanently connected to earth by a high impedance connection and each earthing point is selectively connectable to earth in electrical parallel with the high impedance connection by a solid connection and a switch, and
wherein the switch between the earthing point and the earth of only one of the plurality of earthing points is closed.

17. A method as claimed in claim 16 wherein in a first mode of operation each of the switches is arranged to connect a respective one of the earthing points to earth by a respective one of the solid connections and in a second mode of operation at least one of the switches is arranged to connect the respective one of the earthing points to earth by the respective one of the high impedance connections.

18. A method as claimed in claim 17 wherein a current limiting diode provides the high impedance connection between the earthing point and earth, the current limiting diode provides the solid connection between the earthing point and earth and the current limiting diode provides the switch.

19. A method as claimed in claim 18 wherein the current limiting diode is a silicon carbide current limiting diode.

20. A method as claimed in claim 16 wherein in a first mode of operation, the method comprises closing the switch between the earthing point and the earth of a first one of the plurality of earthing points and opening the switches between the earthing point and the earth of the remainder of the plurality of earthing points.

21. A method of operating an earthing arrangement for a DC electrical system, the electrical system comprising a plurality of earthing points, a plurality of high impedance connections to earth, a plurality of solid connections to earth and a plurality of switches, wherein in a first mode of operation at least one of the switches is arranged to connect a respective one of the earthing points to earth by a respective one of the solid connections and in a second mode of operation said at least one of the switches is arranged to connect the respective one of the earthing points to earth by the respective one of the high impedance connections, wherein each earthing point is at a potential of zero volts,
wherein each earthing point is directly and permanently connected to earth by a high impedance connection and each earthing point is selectively connectable to earth in electrical parallel with the high impedance connection by a solid connection and a switch, wherein in a first mode of operation, the method comprises closing the switch between the earthing point and the earth of a first one of the plurality of earthing points and opening the switches between the earthing point and the earth of the remainder of the plurality of earthing points, and
wherein in a third mode of operation, the method comprises isolating the first one of the plurality of earthing points from the electrical system and closing the switch between the earthing point and the earth of a second one of the plurality of earthing points and opening the switches between the earthing point and the earth of the remainder of the plurality of earthing points.

22. A method as claimed in claim 21 wherein in a second mode of operation, the method comprises opening the switch between the first one of the plurality of earthing points and maintaining the switches between the earthing point and the earth of the remainder of the plurality of earthing points in an open condition.

23. A method as claimed in claim 21 wherein the switch is a mechanical switch or an electrical switch.

24. A method as claimed in claim 21 wherein the switch is an electrical switch.

* * * * *